(12) United States Patent
Nakamura et al.

(10) Patent No.: US 12,105,581 B2
(45) Date of Patent: Oct. 1, 2024

(54) FAILURE SYMPTOM DETECTION SYSTEM, FAILURE SYMPTOM DETECTION METHOD, AND RECORDING MEDIUM

(71) Applicant: Mitsubishi Electric Corporation, Tokyo (JP)

(72) Inventors: Tatsuki Nakamura, Tokyo (JP); Yoichiro Koga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 40 days.

(21) Appl. No.: 18/044,469

(22) PCT Filed: Oct. 7, 2020

(86) PCT No.: PCT/JP2020/038061
§ 371 (c)(1),
(2) Date: Mar. 8, 2023

(87) PCT Pub. No.: WO2022/074777
PCT Pub. Date: Apr. 14, 2022

(65) Prior Publication Data
US 2023/0325271 A1    Oct. 12, 2023

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC .......................... G06F 11/079; G06F 11/0709
(Continued)

(56) References Cited

U.S. PATENT DOCUMENTS

| | | | |
|---|---|---|---|
| 5,969,697 A | 10/1999 | Tani et al. | |
| 2011/0047413 A1* | 2/2011 | McGill | G06F 11/2002 717/172 |

(Continued)

FOREIGN PATENT DOCUMENTS

| | | |
|---|---|---|
| JP | H06314181 A | 11/1994 |
| JP | 2004268633 A | 9/2004 |

(Continued)

OTHER PUBLICATIONS

International Search Report (PCT/ISA/210) with English translation and Written Opinion (PCT/ISA/237) mailed on Nov. 10, 2020, by the Japan Patent Office as the International Searching Authority for International Application No. PCT/JP2020/038061.

*Primary Examiner* — Sarai E Butler
(74) *Attorney, Agent, or Firm* — BUCHANAN INGERSOLL & ROONEY PC

(57) ABSTRACT

A failure symptom detection system includes a first storage to collect and store field data of each of a plurality of Internet of things devices, a feature extractor to acquire feature data of the field data based on a report on a failure in a service as a feeling of a user of a facility, a second storage to accumulate a failure at an occurrence of the failure associated with content of the failure as the feeling of the user, and a failure symptom detector to monitor the field data stored in the first storage, and produce, upon detecting feature data matching the feature data accumulated in the second storage, output indicating detection of a symptom of the failure associated with the feature data.

14 Claims, 16 Drawing Sheets

(58) Field of Classification Search
USPC ..................................................... 714/1–57
See application file for complete search history.

(56) References Cited

U.S. PATENT DOCUMENTS

| | | |
|---|---|---|
| 2015/0184880 A1 | 7/2015 | Kawamura |
| 2017/0075744 A1* | 3/2017 | Deshpande ......... H04L 41/0631 |
| 2017/0245176 A1* | 8/2017 | Murphy ................ H04W 24/04 |
| 2018/0191814 A1* | 7/2018 | Kinarti ................ H04L 43/0876 |
| 2020/0159203 A1 | 5/2020 | Shetty B et al. |
| 2020/0278915 A1* | 9/2020 | Degaonkar ......... G06F 11/3476 |
| 2021/0303378 A1* | 9/2021 | Sethi ................... G06F 18/2178 |

FOREIGN PATENT DOCUMENTS

| | | |
|---|---|---|
| JP | 2015103218 A | 6/2015 |
| JP | 2019113970 A | 7/2019 |
| JP | 2020014035 A | 1/2020 |
| JP | 2020066493 A | 4/2020 |
| WO | 2014064792 A1 | 5/2014 |

* cited by examiner

FIG.3

| ITEMS OF FIELD DATA |
| --- |
| TIME |
| FIELD SITE ID |
| DEVICE ID |
| VALUE RESULTING FROM CONVERSION |
| UNIT |
| MEANING OF VALUE |

FIG.4A

```
{
    "timestamp": 1591860637,
    "field_id": "FLD-01-0123",
    "device_id": "DVE-AC-ZR232C-001462",
    "value": 25.4,
    "unit": "Celsius",
    "meta_info": "Intale Air Temperature"
}
```

FIG.4B

```
{
    "timestamp": 1591860637,
    "field_id": "FLD-01-0123",
    "device_id": "DVE-VR-VR01R-00022",
    "value": "It is hot and humid around here.",
    "unit": "Voice",
    "meta_info": "Human Voice"
}
```

FIG.5

FAILURE INFORMATION

| ITMES OF FAILURE INFORMATION | REGISTRANT | FORM |
|---|---|---|
| FAILURE NUMBER | AUTOMATICALLY GENERATED WHEN REGISTERING FAILURE INFORMATION | ID (ALPHANUMERIC CHARACTERS) |
| DATE AND TIME | USER, MANAGER, AND OPERATOR | TIME |
| FIELD SITE ID | USER, MANAGER, AND OPERATOR | ID (ALPHANUMERIC CHARACTERS) |
| FAILURE CONTENT | USER, MANAGER, AND OPERATOR | DOCUMENT |
| FAILURE LEVEL | OPERATOR | SELECTABLE FROM CHOICES (INFO, NOTICE, WARN, ERROR, EMERGE, ETC.) |
| FAILURE CLASSIFICATION | OPERATOR | SELECTABLE FROM CHOICES (NOISE, SENSIBLE TEMPERATURE, INTENSITY OF LIGHT, WAITING TIME, ETC.) |
| FAILURE CAUSE | OPERATOR | DOCUMENT |
| MEASURE FOR FAILURE | OPERATOR | DOCUMENT |

FIG.9A

| | |
|---|---|
| FAILURE NUMBER | 00023 |
| DATE AND TIME | 2020-05-12 13:00:00 |
| FIELD SITE ID | FLD-01-0123 |
| FAILURE CONTENT | The user complained the floor has become hot and humid since around 13:00 and no longer wanted to stay on the floor. The air conditioner seems operating, but may not be conditioning air well. |
| FAILURE LEVEL | |
| FAILURE CLASSIFICATION | |
| FAILURE CAUSE | |
| MEASURE FOR FAILURE | |

FIG.9B

| | |
|---|---|
| DATE AND TIME | 2020-06-12 13:00:00 |
| FIELD SITE ID | FLD-01-0123 |
| FAILURE CONTENT | The user complained the floor has become hot and humid since around 13:00 and no longer wanted to stay on the floor. The air conditioner seems operating, but may not be conditioning air well. |
| FAILURE LEVEL | info |
| FAILURE CLASSIFICATION | SENSIBLE TEMPERATURE |
| FAILURE CAUSE | About 1.5 times more people stay on this floor after 13:00 than in the morning. As more people come in and out, cold air in the area near the doors escapes outside. With strong sunlight entering the area near the windows, the sensible temperature in part of the floor gradually exceeds an appropriate temperature, and some users complain of discomfort. |
| MEASURE FOR FAILURE | In the timeslot 13:00 to 15:00, change the schedule to set the temperature setting of the air conditioner management system from 28.0 to 26.0 ° C. |

FAILURE SYMPTOM DETECTION SYSTEM, FAILURE SYMPTOM DETECTION METHOD, AND RECORDING MEDIUM

TECHNICAL FIELD

The present disclosure relates to a failure symptom detection system, a failure symptom detection method, and a program.

BACKGROUND ART

Some facilities such as shops or factories including a large number of Internet of things (IoT) devices such as air conditioners, illuminators, or various sensors use a service that controls the devices for user comfort using data collected from these IoT devices.

Such a service may cause a service level failure. A service level failure indicates that a user has a feeling of dissatisfaction such as discomfort, discontent, or inconvenience from the use of facilities. Specific examples of such service level failures include (i) that a user has a feeling of being hot, cold, or stuffy at the current location, (ii) that a user has a feeling of being distracted by ambient noise, (iii) that a user has a feeling of waiting for an elevator for a long time, and (iv) that a user has a feeling of being poorly lighted and dusky. A service level failure may cause, for example, a complaint or an inquiry to a facility manager.

To reduce such a service level failure, a failure symptom is to be detected, the cause of the symptom and a measure for the symptom are to be identified, and the measure is to be implemented before the failure occurs.

In relation to the above detection technique, Patent Literature 1 describes a system that identifies the cause of and a solution to a failure of a product when a user reports an error. This system includes a switch that indicates an error of a product. In response to the user pressing the switch, the system compares log data of the operation immediately before the error with known error causes in a database, and provides the cause and the content of the measure to the user.

CITATION LIST

Patent Literature

Patent Literature 1: Unexamined Japanese Patent Application Publication No. 2020-14035

SUMMARY OF INVENTION

Technical Problem

The system described in Patent Literature 1 is designed for the user of a system and a facility identical to the operator of the system. This system is thus unapplicable to a facility at which the user and the operator are different.

The system described in Patent Literature 1 identifies and displays the cause of and a measure for an error of a product, not a service level failure. A service level failure may occur independently of products being normal. The system described in Patent Literature 1 thus cannot reduce service level failures.

The system described in Patent Literature 1 identifies and displays a cause of and a measure for a failure of a product in response to the user identifying the failure and operating the switch. In other words, the system described in Patent Literature 1 functions after a failure occurs, and fails to detect a failure symptom.

The present disclosure is made in view of the aforementioned circumstances, and an objective of the present disclosure is to detect a symptom of a service level failure.

Solution to Problem

A failure symptom detection system according to an aspect of the present disclosure detects a symptom of a failure at a field site including a facility including a plurality of Internet of things devices. The failure symptom detection system includes a first storage to collect and store field data of each of the plurality of Internet of things devices, a feature extractor to acquire feature data of the field data based on a report on a failure in a service as a feeling of a user of the facility, a second storage to accumulate failure information associating the feature data of the field data at an occurrence of the failure with content of the failure as the feeling of the user, and a failure symptom detector to monitor the field data stored in the first storage, and produce, upon detecting feature data corresponding to or resembling, that is, matching the feature data accumulated in the second storage, output indicating detection of a symptom of the failure associated with the feature data.

Advantageous Effects of Invention

The failure symptom detection system according to the above aspect produces output indicating detection of a failure symptom when a failure symptom detector detects, in a second storage, field data having the same or similar features to the features of field data stored in a first storage. This system can thus detect a symptom of a service level failure.

BRIEF DESCRIPTION OF DRAWINGS

FIG. 3 is a diagram of a format of field data illustrated in FIG. 1;

FIG. 4A is a diagram of an example of field data including temperature data generated by an IoT device, such as an air conditioner or a temperature sensor, in the failure symptom detection system illustrated in FIG. 1;

FIG. 4B is a diagram of an example of field data including speech information generated by an IoT device having a voice analysis function in the failure symptom detection system illustrated in FIG. 1;

FIG. 5 is a table of example failure information accumulated in a failure information DB illustrated in FIG. 1;

FIG. 9A is a diagram of an example of failure information registered by an inquiry receiver in the failure symptom detection system illustrated in FIG. 1;

FIG. 9B is a diagram of an example analysis of a failure registered by a failure manager in the failure symptom detection system illustrated in FIG. 1;

DESCRIPTION OF EMBODIMENTS

A failure symptom detection system and a method for detecting a failure symptom according to one or more embodiments of the present disclosure are described below with reference to the drawings. Throughout the drawings, the same or corresponding components are given the same reference signs.

The failure symptom detection system according to the present embodiment detects a symptom of a service level failure that is a failure in a service level at a facility using field data collected from multiple Internet of things (IoT) devices installed at the facility. Upon detecting a symptom, the failure symptom detection system provides, to a facility manager, a notification of the cause and the measure. The IoT devices refer to devices such as equipment, apparatuses, systems, and sensors connected to the Internet. The service level at a facility refers to an entire service level at the facility or user satisfaction with the facility. The service level failure is occurrence of a circumstance in which a user has a negative feeling, such as a feeling of discomfort, discontent, inconvenience, anxiety, dissatisfaction, or difficulty. Occurrence of the service level failure indicates occurrence of a circumstance in which (i) a user has a feeling of being hot, cold, or stuffy at the current location, (ii) a user has a feeling of being distracted by ambient noise, (iii) a user has a feeling of waiting for an elevator for a long time, and (iv) a user has a feeling of being poorly lighted and dusky, or the like.

Entire Configuration of Failure Symptom Detection System 100

Figure 1:
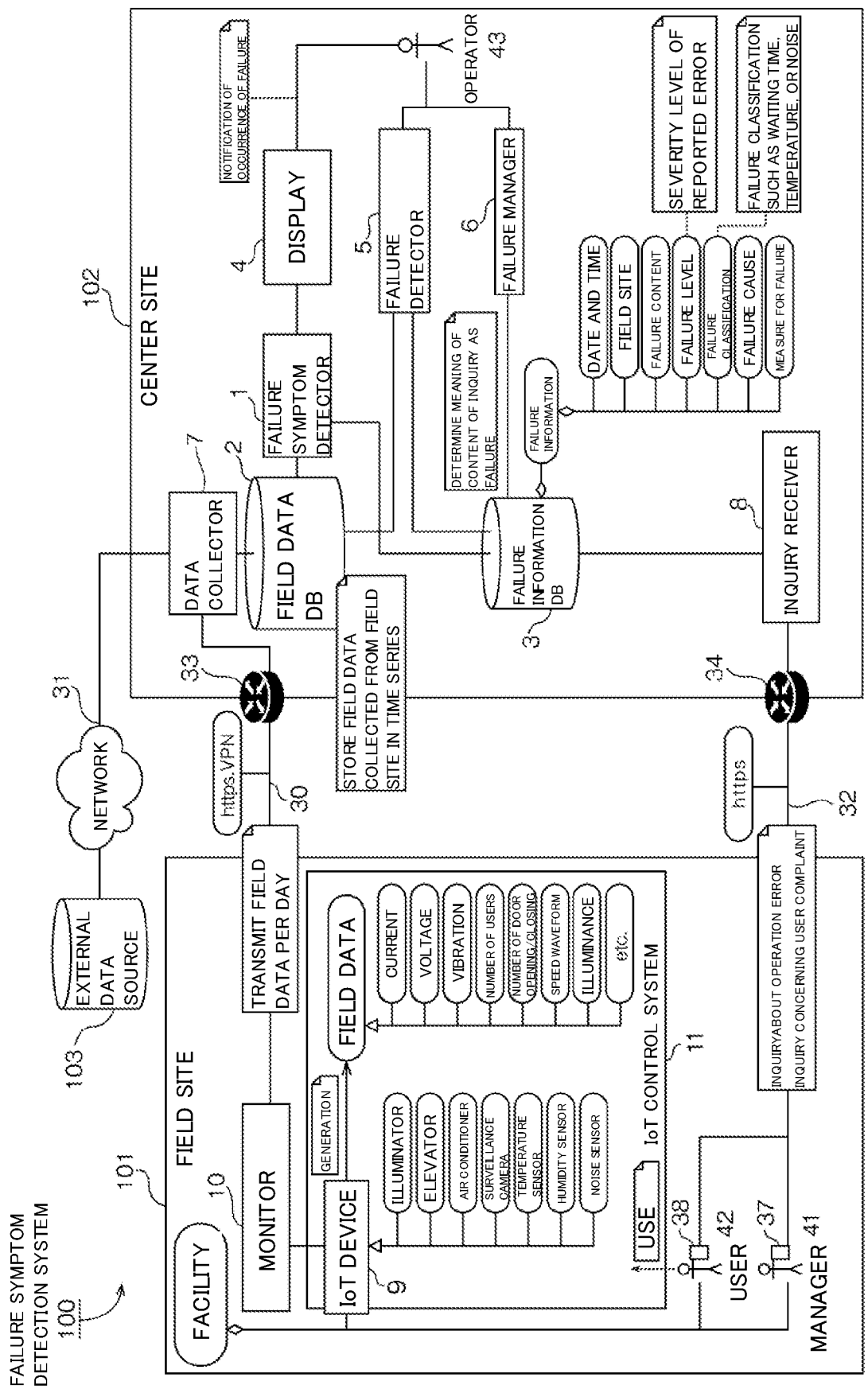
FIG. 1 is a schematic block diagram of a failure symptom detection system according to an embodiment of the present disclosure.

FIG. 1 is a schematic block diagram of a failure symptom detection system 100 according to the present embodiment.

The failure symptom detection system 100 operates and manages IoT devices. The failure symptom detection system 100 includes one or more field sites 101, a single center site 102, and an external data source 103. FIG. 1 simply illustrates one field site 101.

Configuration of Field Site 101

The field site 101 typically includes a facility such as a house, a building, a factory, a commercial facility, or a sport facility, and multiple IoT devices 9 installed at the facility. These IoT devices 9 generate field data with measuring devices such as built-in sensors. The multiple IoT devices 9 cooperate together to integrally provide a service for providing comfort for a user 42 of the facility. This integral service level or satisfaction of the user 42 refers to the above service level. A failure that lowers the service level, that is, occurrence of a circumstance in which the user 42 has a negative feeling such as discomfort, discontent, inconvenience, anxiety, dissatisfaction, or difficulty corresponds to a service level failure.

In addition to the IoT devices 9, the facility includes a monitor 10 that transmits field data generated by the IoT devices 9 to a data collector 7 in the center site 102 through a communication network (hereafter, a network) 30.

The IoT devices 9 include, for example, illuminators, elevators, air conditioning devices (hereafter, simply air conditioners), surveillance cameras, temperature sensors, humidity sensors, noise sensors, and microphones. These IoT devices 9 are included in an IoT control system 11 that controls the environment at the facility.

Figure 2:
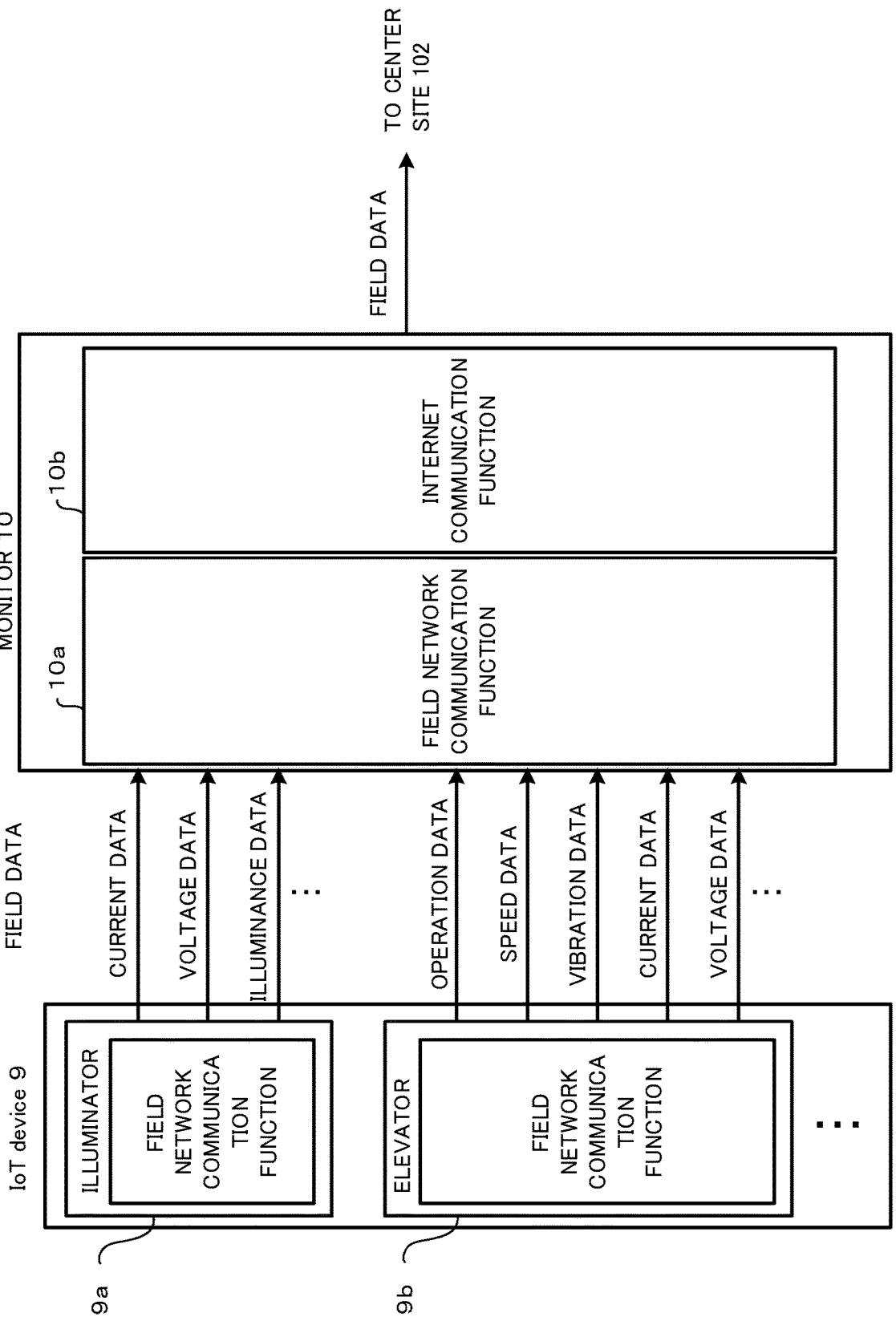
FIG. 2 is a block diagram of a field site illustrated in FIG. 1.

As illustrated in FIG. 2, each IoT device 9 has a field network communication function or an area network communication function to generate field data and transmit the field data to the monitor 10. The field network communication function is implemented by various communication functions such as Ethernet, a controller area network (CAN), Wi-Fi, Bluetooth, Bluetooth Low Energy (BLE), or ZigBee.

More specifically, as illustrated in the example of FIG. 2, an illuminator 9a outputs, as example field data, current data indicating the current flowing to a light source, voltage data indicating the voltage applied to the light source, and illuminance data indicating the illuminance at a predetermined position. An elevator 9b outputs, as example field data, operation data indicating the operation state, speed data indicating the speed of the cage, vibration data indicating the magnitude of vibrations of the cage, current data indicating the current flowing to a driving motor, and voltage data indicating the voltage applied to the driving motor. Each IoT device 9 may output any field data.

Each IoT device 9 may be located at any position.

As illustrated in the example of FIG. 3, each piece of field data indicates a data item such as date and time, a field site ID, a device ID, a value resulting from conversion, a unit, or the meaning of a value.

The date and time indicates the date and time when the data is generated, or typically, a time stamp. The field site ID indicates a unique identifier of the field site 101 at which the IoT device 9 is installed.

The device ID indicates a unique identifier of the IoT device 9 that has generated the field data. Through examination, the device ID indicates the type of the IoT device 9, for example, whether the IoT device 9 is an air conditioner, a lighting fixture, or a surveillance camera, model designation, or a manufacturer's serial number.

The value resulting from conversion indicates a numerical value acquired by converting an analogue value measured by a sensor to a digital value, and then converting the data into a specific unit. For example, the value resulting from conversion indicates a value of a current converted into ampere, a value of a voltage converted into volt, a value of a temperature converted into centigrade, or a value of a sound converted into decibel.

The unit indicates a unit of the value resulting from conversion, such as an ampere A, a volt V, a centigrade ° C., or a decibel dB.

The meaning of a value indicates the features of data including a combination of, for example, an installation location and a measurement method. Field data may include other items such as an installation location or an installation date of the IoT device 9 at the facility, and a management department for the IoT device 9.

Specific examples of field data are illustrated in FIGS. 4A and 4B.

Field data illustrated in FIG. 4A is example temperature data generated by the IoT device 9 such as an air conditioner or a temperature sensor. Field data illustrated in FIG. 4B is example speech data generated by a device having a voice analysis function. These pieces of field data are written in JavaScript Object Notation (JSON) widely used for data transmission or reception through a web application programming interface (API), but may be written in any form. In the present embodiment, the pieces of field data may be written in an easily mechanically analyzable form such as the extensible markup language (XML).

On the fourth line device id in the field data illustrated in FIG. 4A, DVE is an abbreviation of a device, AC is an abbreviation of an air conditioner, ZR232C denotes model designation of the air conditioner, and 001462 denotes a manufacturer's serial number of the air conditioner.

In device id in the field data illustrated in FIG. 4B, VR is an abbreviation of voice recognition, VR01R denotes model designation of a voice recognition device, and 00022 denotes a manufacturer's serial number of the voice recognition device. The value "It is hot and humid around here" is text data acquired through voice recognition.

In FIGS. 4A and 4B, data is hyphenated to be used as the device ID, but may have another form. The device ID may be in any form. For example, the type of device, the model designation, or the manufacturer's serial number may be hashed using a universally unique identifier (UUID) v5.

While in operation, the IoT device 9 illustrated in FIGS. 1 and 2 successively, cyclically, or repeatedly acquires various data, and stores and accumulates the data in an internal memory. The IoT device 9 generates field data in a predetermined cycle based on the accumulated data, and transmits the field data to the monitor 10. Each IoT device 9 typically generates and transmits field data once a day. Each IoT device 9 may generate and transmit field data more or less often.

The monitor 10 is, for example, a server device called an edge server. As illustrated in FIG. 2, the monitor 10 includes a field network communication function 10a of receiving field data from the IoT device 9, and an internet communication function 10b of transmitting the received field data to the center site 102. The internet communication function is implemented by a communication device conforming to various communications standards such as Ethernet, an optical fiber network, or a cellular network (3G/4G/5G). In the present embodiment, the monitor 10 is connected to the center site 102 through the network 30 such as the Internet or a virtual private network (VPN).

A manager 41 and the user 42 at the field site 101 can transmit information to an inquiry receiver 8 in the center site 102 through a communication network (hereafter, network) 32 such as the Internet using corresponding communication terminals 37 and 38 held by the manager 41 and the user 42. The manager 41 and the user 42 can register the content of the service level failure in, for example, text or voice with the inquiry receiver 8 through the communication terminals 37 and 38.

Configuration of Center Site 102

The center site 102 illustrated in FIG. 1 includes a failure symptom detector 1 that detects a symptom of a service level failure, a field data database (hereafter, DB) 2 that stores field data, a failure information DB 3 that accumulates a combination of failure information and feature data of a failure that has actually occurred in the past, a display 4 that displays data, a failure detector 5 that detects a failure symptom, a failure manager 6 that manages the failure information DB 3, the data collector 7 that collects data from the field site 101 and the external data source 103, and the inquiry receiver 8 that receives an inquiry from the field site 101.

The field data DB 2 classifies field data transmitted from the field site 101 by type, and records and stores the field data in time series. The field data DB 2 is an example of a first storage.

The failure detector 5 refers to field data stored in the field data DB 2 based on content of the inquiry concerning the service level failure from the manager 41 or the user 42, identifies the field data when the failure has occurred, identifies the change of the field data as a feature, and extracts feature data representing the feature. The change indicates a preset change, for example, a change from an invariable or variable reference value, a change from the previously acquired value of field data, or a change from a moving average. Instead, the change may be a value with a sign or an absolute value of the change, a direction of the change, or a tendency of the change. The change may be a change pattern on a time axis or in a space. The failure detector 5 associates the field data with the extracted feature data into a combination, and registers the combination with the failure information DB 3. The failure detector 5 is an example of a feature extractor.

The failure information DB 3 accumulates failure information including field data at the occurrence of a failure identified by the failure detector 5, feature data, and content of the failure in the service level felt by the user 42, and the like.

As illustrated in the example of FIG. 5, failure information includes data items including a failure number, date and time, a field site ID, failure content, a failure level, failure classification, a failure cause, and a measure for the failure. The failure information may include other data items. As described above, the failure information associates field data at receipt of an inquiry, that is, at the occurrence of a failure, and the feature data of the field data. The failure information DB 3 is an example of a second storage.

The failure number is an identifier including alphanumeric characters for uniquely identifying the failure information, and automatically assigned by the inquiry receiver 8.

The date and time correspond to date and time when the failure information is registered with the inquiry receiver 8, and typically conform to ISO8601.

The field site ID is a unique identifier of the field site 101 at which the failure is reported, and is identical to the field site ID of the field data.

The failure content is a document written with a natural language and describing the situation and the content of a failure. For example, the failure content is a text string input by the manager 41 or the user 42 through the communication terminal 37 or 38, or a text string acquired through recognition of voice of the manager 41 or the user 42.

The failure level indicates the urgency of the failure in level, and is assigned in accordance with the failure content. The failure level is selectable from choices that can be added, changed, or deleted as appropriate.

The failure classification is a type of failure such as noise, heat and humidity, the intensity of light, or waiting time, assigned in accordance with the failure content. The failure classification is selectable from choices that can be added, changed, or deleted as appropriate.

The failure cause is a document describing a cause of a failure, registered after the examination of the failure, and written with a natural language.

The measure for the failure is a document describing a measure for the failure, registered after the measure for the failure is implemented, and written with a natural language.

The failure number is automatically assigned by the inquiry receiver 8. The date and time, the field site ID, and the failure content may be registered by the user 42, the manager 41, or an operator 43. The failure level, the failure classification, the failure cause, and the measure for the failure are registered by the operator 43. However, the registration may be differently performed.

Of the failure information, the failure number, the date and time, the field site ID, and the failure content are registered by the inquiry receiver 8 when a notification of occurrence of a failure is provided from the communication terminal 37 for the manager 41 or the communication terminal 38 for the user 42. The failure level, the failure classification, the failure cause, and the measure for the failure are registered by the operator 43 in the center site 102 through the failure manager 6. As appropriate, the operator 43 may adjust association between data pieces through the failure manager 6.

The form of information illustrated in FIG. 5 is a mere example and is not limitative.

The failure symptom detector 1 illustrated in FIG. 1 detects a failure symptom from the field data stored in the field data DB 2 and the feature data accumulated in the failure information DB 3. More specifically, the failure symptom detector 1 detects a change in the field data stored in the field data DB 2 and acquires a feature of the field data. The failure symptom detector 1 determines, based on the reference, whether the acquired feature corresponds to or resembles (hereafter collectively referred to as matches) any of the features indicated in the feature data accumulated in the failure information DB 3, or any of the features in field data in the time slot in which the failure is actually reported. Upon identifying one or more features that match, the failure symptom detector 1 extracts field data and failure information associated with the identified feature from the failure information DB 3, and, for example, lists the ordinal rank, similarity, failure information, and field data in the descending order of similarity. More specifically, the failure symptom detector 1 detects a change in the field data stored in the field data DB 2, and acquires feature data of the field data. The failure symptom detector 1 determines, through similarity calculation, similarity between the acquired feature data and each of multiple pieces of the feature data accumulated in the failure information DB 3. The failure symptom detector 1 identifies feature data with similarity higher than the reference, extracts failure information and field data associated with the identified feature data, and, for example, lists the failure information and the field data in the descending order of similarity. The absence of feature data with similarity higher than the reference indicates the absence of a failure symptom. When multiple pieces of feature data with similarity higher than or equal to the reference are identified, the pieces of feature data may be narrowed to a predetermined number of pieces.

Figure 13:
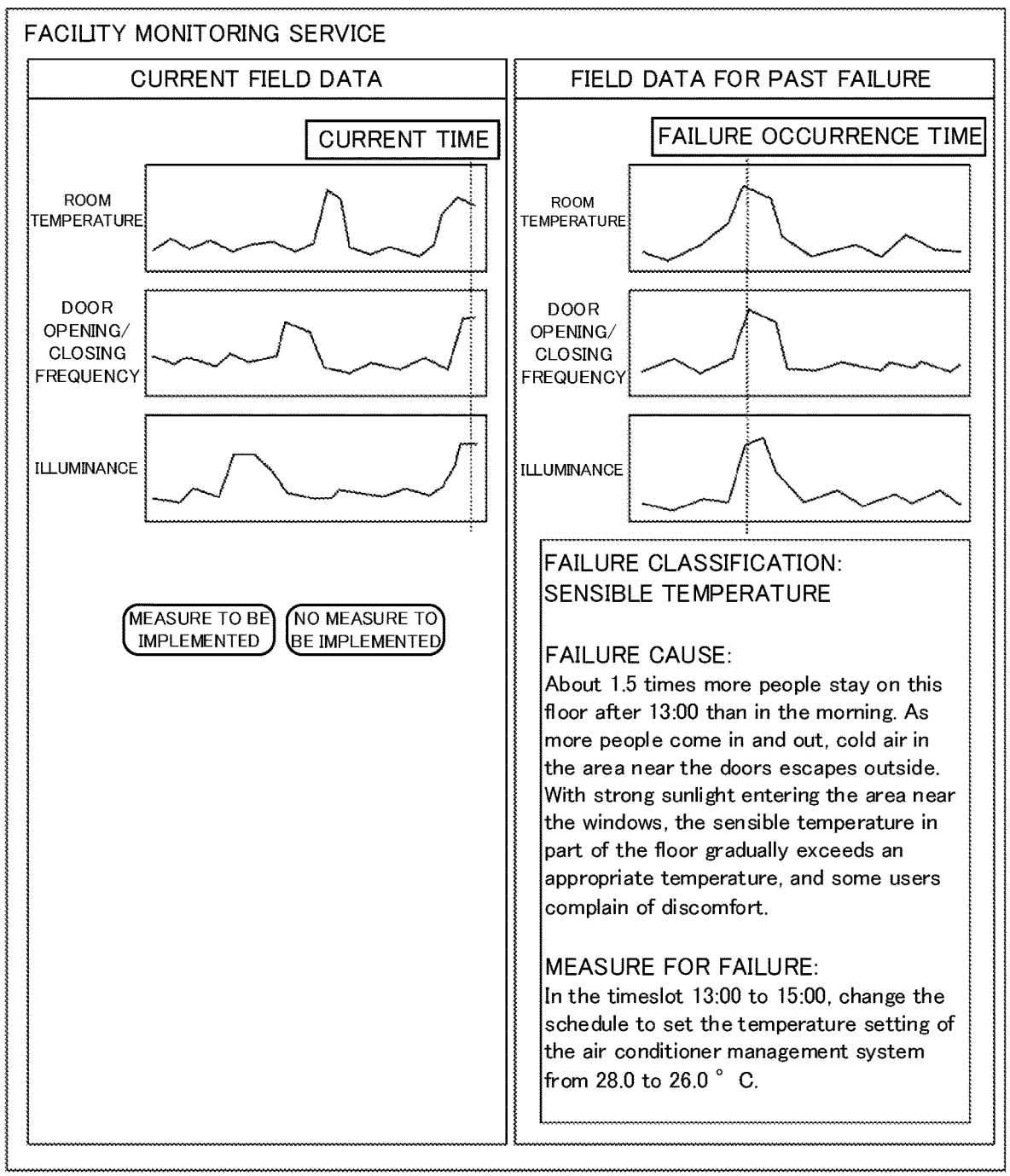
FIG. 13 is a diagram of a display with an example screen configuration for the operator to check and analyze a failure symptom.

The display 4 is a liquid crystal display or an electroluminescent display and connected to the failure symptom detector 1 to provide one or more pieces of failure information extracted by the failure symptom detector 1 to the operator 43 as a symptom. More specifically, the display 4 displays the list generated by the failure symptom detector 1 as a notification of the symptom. In accordance with the operation performed by the operator 43, the display 4 displays, for example, the details of the selected failure information, relevant feature data, and a group of field data, as illustrated in the example of FIG. 13.

In accordance with the operation performed by the operator 43, the failure manager 6 registers, for example, the failure level, the failure classification, the failure cause, and the measure for the failure in the failure information with the failure information DB 3. In accordance with the operation performed by the operator 43, the failure manager 6 also edits the registered failure information. The failure manager 6 may perform other operations performed by the operator 43 on the failure information DB 3.

The data collector 7 receives field data transmitted from the monitor 10 installed at the field site 101. The data collector 7 collects external data from the external data source 103. The data collector 7 stores the received field data and the collected external data in the field data DB 2.

The data collector 7 is typically implemented by a resident daemon program. The daemon program includes a communication API for receiving field data transmitted from the monitor 10 in the field site 101. The API shares a sharable program specialized in a single function or a software function. The data collector 7 registers the collected field data with the field data DB 2.

The failure detector 5, the failure manager 6, and the data collector 7 implement a web application, and the user can operate each unit through a browser.

The inquiry receiver 8 receives, for example, an inquiry about a failure in the service level felt by the user 42 at the facility, an inquiry about an operation error at the facility from the user 42 or the manager 41, a complaint, or a notice. The inquiry receiver 8 responds to the inquiry, assigns a failure number, and stores the inquiry in the failure information DB 3 as failure information. The inquiry receiver 8 registers a text transmitted from the user 42 or the manager 41 through the communication terminal 38 or 37 with the failure information DB 3 as information indicating failure content. The inquiry receiver 8 may include a voice recognition function. In this case, the inquiry receiver 8 converts the voice of the user 42 or the manager 41 into a text, and can register the text with the failure information DB 3 as information indicating the failure content.

The external data source 103 is a data source outside the facility. External data includes, for example, weather information such as weather, temperature, and humidity acquired from information about weather forecasts around the facility, or traffic information. For example, in rainy and humid outside conditions, a commercial facility can enhance user satisfaction by lowering the inside humidity.

External data accumulated in the external data source 103 varies depending on the type of facility to be managed or the district of the facility. For example, the external data source 103 accumulates information such as a snowfall in a cold district.

In a cold district, snow or snow clouds may affect radio waves, disabling data transmission or reception. In this situation, when snow disconnects the network extended throughout a factory, serving as a target facility, the cause of a failure is not easily accessible simply from the state of a factory automation (FA) device in the factory. In this case, acquiring data relating to a snowfall as external data allows finding the cause of disconnection.

Depending on the failure and the cause of the failure that has occurred in the field site 101 to be monitored, more data sources are to be monitored. For example, an increase of failure information about a cloud service accumulated in the external data source 103 allows determination as to whether the failure cause is in the cloud service, snow, or the service provided by the provider of the service. This configuration can more accurately and promptly implement a measure against the inquiry from the user 42.

The center site 102 includes a device gateway 33 to connect the data collector 7 and the monitor 10 in the field site 101 to receive field data from the field site 101.

The device gateway 33 typically receives an encrypted communication packet transmitted through the network 30. After decrypting the received communication packet, the device gateway 33 provides the communication packet in plain text to the data collector 7.

The center site 102 also includes an application gateway 34 between the inquiry receiver 8 and the communication terminal 37 used by the manager 41 in the field site 101 or between the inquiry receiver 8 and the communication terminal 38 used by the user 42 in the field site 101. The application gateway 34 communicates with the communication terminals 37 and 38. The communication terminals 37 and 38 are, for example, computers, smartphones, or tablets.

The inquiry receiver 8 receives information including an inquiry or a complaint against a service level failure through the application gateway 34.

The application gateway 34 typically receives an encrypted communication packet transmitted from the communication terminal 37 or 38 through the network 32, decrypts the communication packet, and then provides the communication packet in plain text to the inquiry receiver 8.

Figure 6:
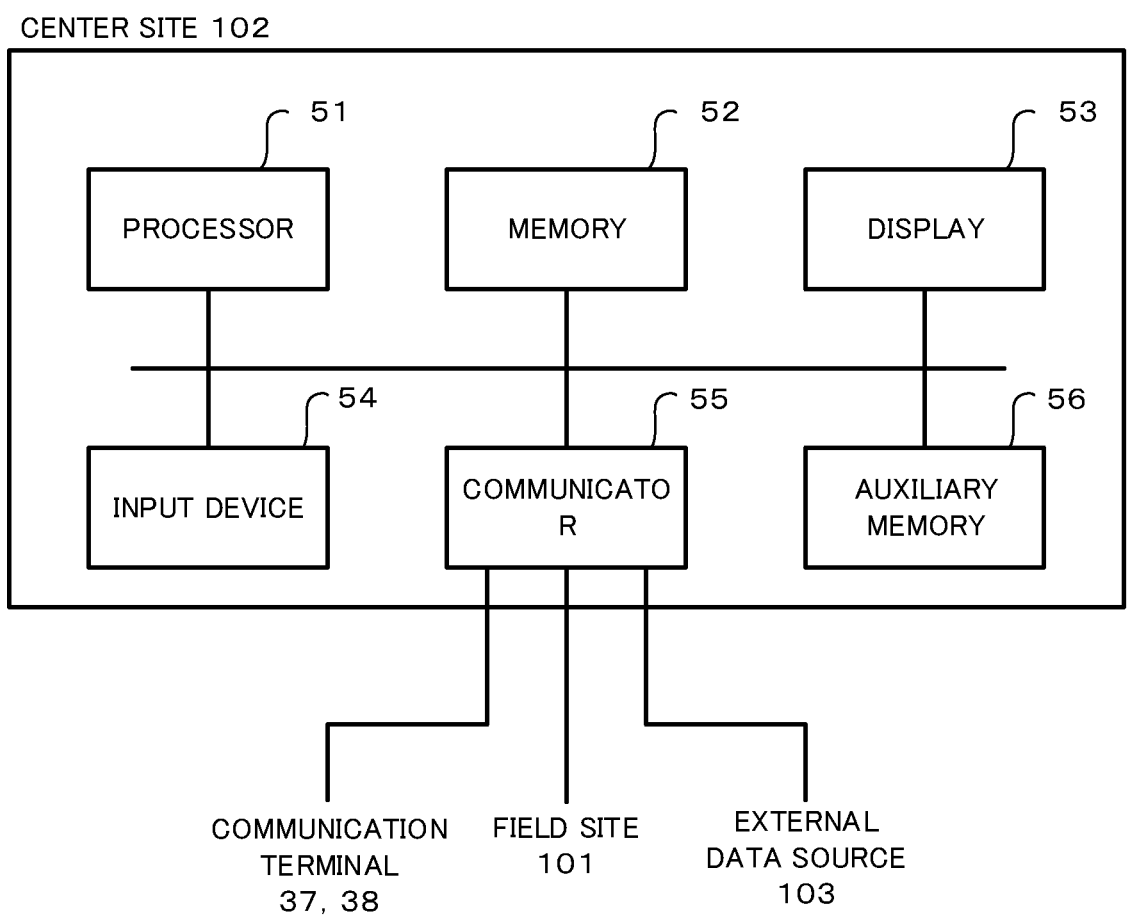
FIG. 6 is a diagram of a center site in FIG. 1, illustrating the hardware configuration.

As illustrated in, for example, FIG. 6, as hardware components, the center site 102 with the above configuration is a computer including a processor 51, a memory 52, a display 53, an input device 54, a communicator 55, and an auxiliary memory 56.

The processor 51 executes an operation program stored in the memory 52.

The memory 52 includes, for example, a read-only memory (ROM) and a random-access memory (RAM) to store programs executable by the processor 51 and fixed data used for the execution. The memory 52 functions as a work area for the processor 51.

The display 53 functions as the display 4 illustrated in FIG. 1.

The input device 54 includes, for example, a keyboard and a mouse, and is operated by the operator 43 for data input.

The communicator 55 communicates with the monitor 10 in the field site 101 through the device gateway 33, communicates with the external data source 103, and communicates with the communication terminals 37 and 38.

The auxiliary memory 56 is a storage device such as a flash memory or a hard disk drive, and functions as the field data DB 2 and the failure information DB 3.

The failure symptom detector 1, the failure detector 5, the failure manager 6, the data collector 7, and the inquiry receiver 8 illustrated in FIG. 1 are implemented by the processor 51 executing the operation program stored in the memory 52.

The operation of the failure symptom detection system 100 with the above configuration is described.

Figure 7A:
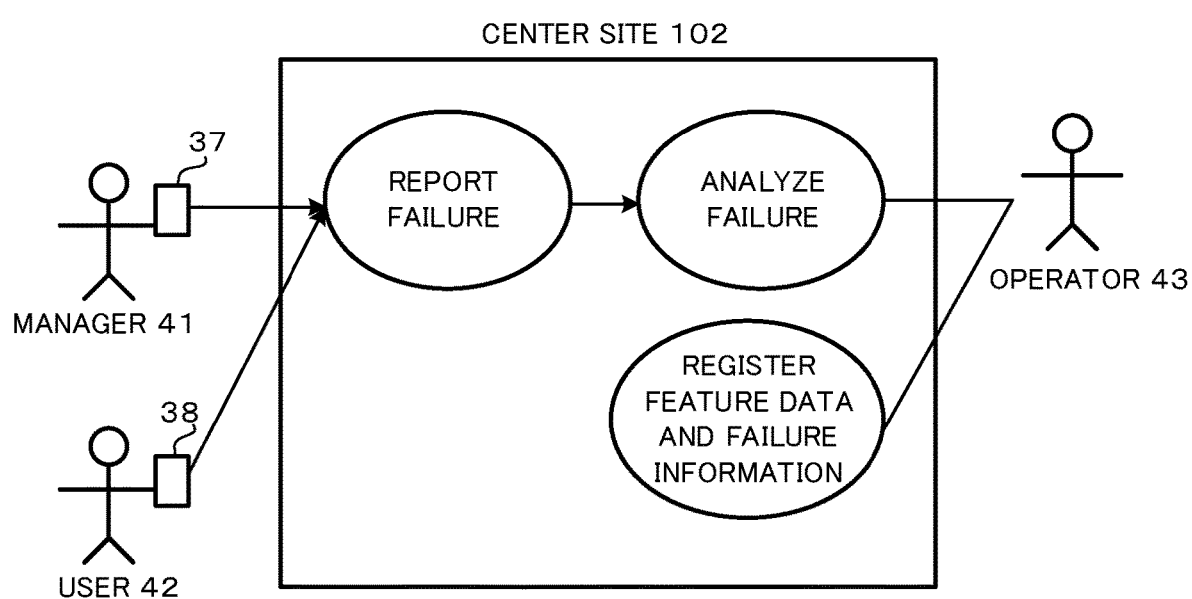
FIG. 7A is a diagram illustrating use cases of the failure symptom detection system according to the embodiment.
Figure 7B:
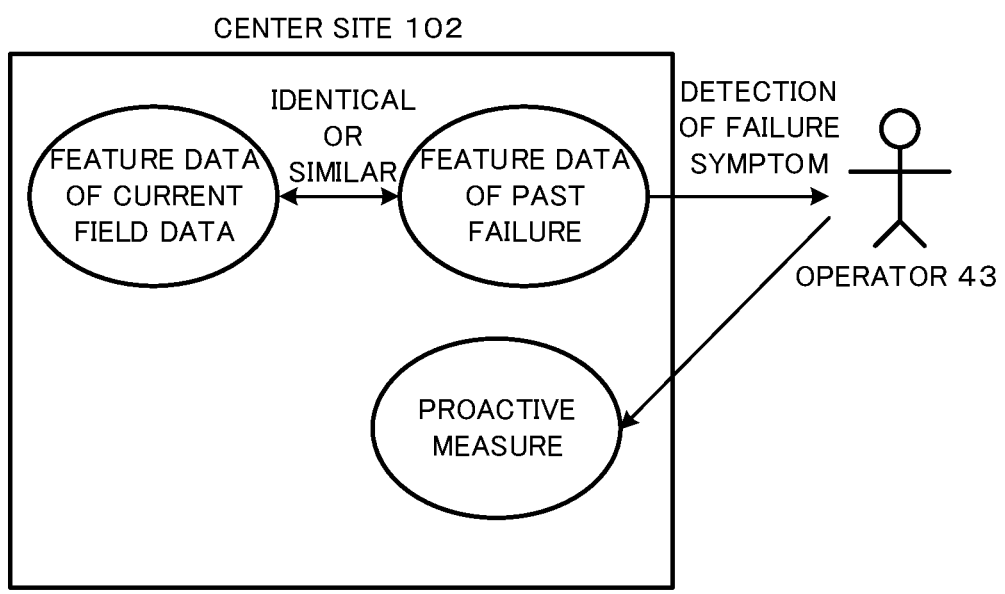
FIG. 7B is a diagram illustrating use cases of the failure symptom detection system according to the embodiment.

The failure symptom detection system 100 detects a service level failure symptom in roughly two phases including a learning phase illustrated in FIG. 7A and a symptom detection phase illustrated in FIG. 7B.

(1) Learning Phase

The center site 102 stores field data received from the field site 101 in the field data DB 2. As illustrated in FIG. 7A, the manager 41 or the user 42 makes an inquiry about—a service level failure to the center site 102. Notices or complaints about a service level failure from the manager 41 or the user 42 are collectively referred to as inquiries about a service level failure. Inquiries function as reports of failures. In response to an inquiry, the inquiry receiver 8 assigns a failure number, identifies date and time, and identifies the failure content. The inquiry receiver 8 registers part of failure information such as the failure number and the date and time with the failure information DB 3.

The inquiries are also provided to the operator from the inquiry receiver 8 through, for example, the display 4. Thus, the operator 43 detects a service level failure. The operator 43 first analyzes field data stored in the field data DB 2 using the failure detector 5, and detects a change in the field data in a time slot immediately before or after the occurrence of the service level failure to acquire feature data. The failure detector 5 associates the field data and the acquired feature data with the failure information using the failure number as a key to store the field data and the acquired feature data in the failure information DB 3. Although not described in detail, the external data acquired from the external data source 103 is similarly treated as field data.

The operator 43 analyzes the failure, and implements a measure against the failure as appropriate. After implementing the measure against the failure, the operator 43 additionally registers information such as the failure level, the classification, the cause, and the measure using the failure manager 6 with the failure information DB 3.

After such operations are repeated, combinations of field data, feature data, and failure information for actual service level failures are gradually accumulated in the failure information DB 3.

(2) Symptom Detection Phase

The center site 102 determines whether a failure symptom occurs, for example, every time when new field data or external data is stored in the field data DB 2. More specifically, the center site 102 generates feature data from the field data and the external data stored in the field data DB 2. Subsequently, the center site 102 determines, through similarity calculation, similarity between the currently generated feature data and each of multiple pieces of feature data registered with the failure information DB 3. The center site 102 determines whether the feature data that matches the currently generated feature data has been registered with the failure information DB 3. The similarity may be calculated by any method such as the least squares method. For example, the center site 102 determines the feature data with the determined similarity higher than or equal to the reference as feature data that matches the currently generated feature data. When no feature data matches the currently generated feature data, no data has a symptom. Multiple pieces of feature data that match the currently generated feature data may be narrowed to a predetermined number of pieces based on the similarity.

When the center site 102 determines that the matching feature data is registered with the failure information DB 3, the center site 102 extracts the field data and the failure information associated with the feature data determined as matching the currently generated feature data, lists the field data and the failure information in order of similarity, and displays the field data and the failure information on the display 4 as a notification to the operator 43. In accordance with the notified failure and the measure, the operator 43 performs an analysis and implements a predetermined measure for preventing a failure.

The resulting feature data, field data, and failure information are registered with the failure information DB 3 to be used to detect a subsequent symptom. More specifically, the symptom detection phase has a function as a learning phase. The learning phase and the symptom detection phase are thus performed in parallel. In the example described below, for ease of understanding, the learning phase and the symptom detection phase are sequentially performed.

The above procedure is described in detail with reference to FIGS. 8 to 13.

(1) Learning Phase

Figure 8:
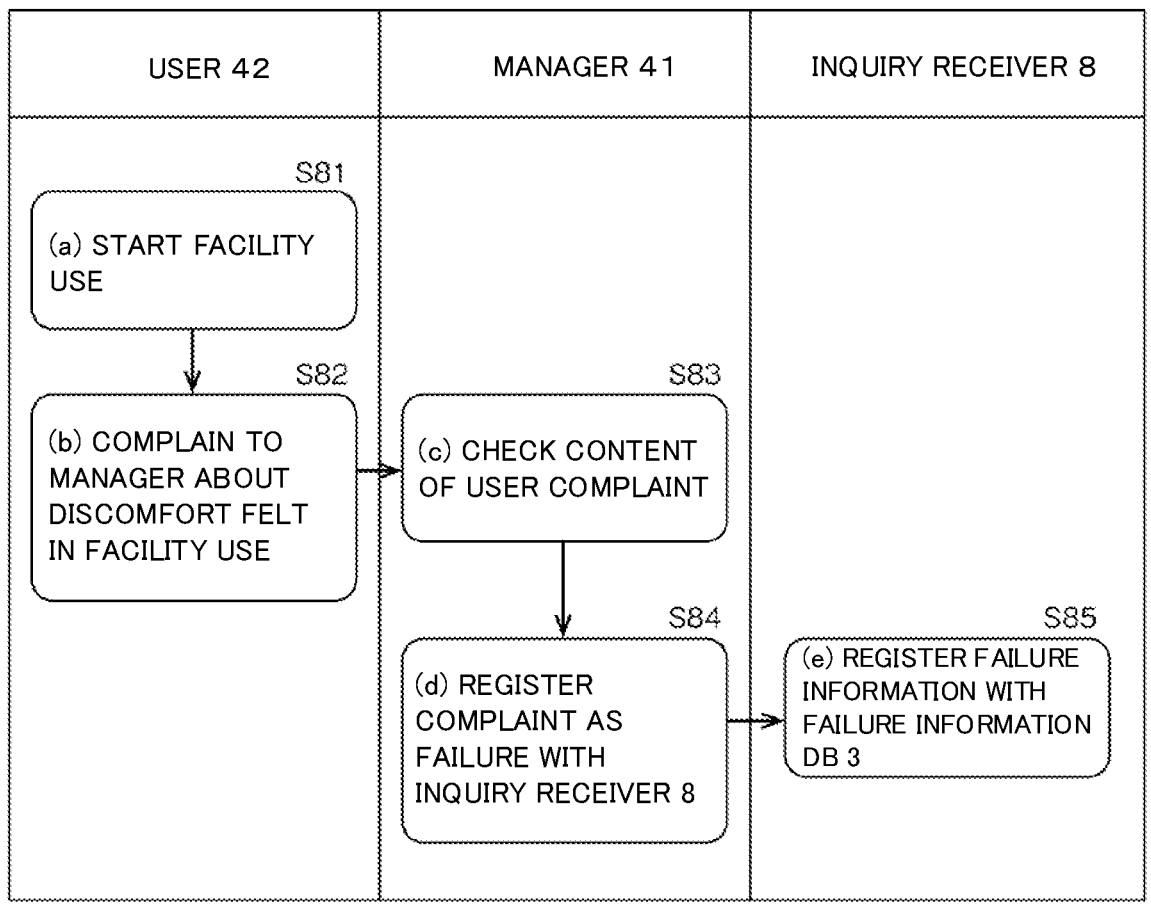
FIG. 8 is a diagram of an example procedure when a failure is reported to the center site illustrated in FIG. 1.

Inquiry Process (a) The user 42 enters a facility to start using the facility (step S81 in FIG. 8). The user 42 may continuously feel discomfort or inconvenience for a specific period. For example, the user 42 may feel hot and humid in a specific time slot.

(b) After feeling hot and humid for several hours, the user 42 provides to the manager 41 a notification that, as a service level failure of producing a discomfort feeling, the entire floor is humid to impair the use of the facility (step S82). This notification may be provided verbally, for example, by phones, or in text such as emails.

(c) The manager 41 checks the complaint from the user 42, or the service level failure, and determines whether any measure is to be implemented against the complaint (step S83).

(d) The manager 41 accesses the inquiry receiver 8 through the communication terminal 37, and registers information about the failure content, for example, in text (step S84). The user 42 may direct an inquiry to the inquiry receiver 8 using the communication terminal 38.

(e) The inquiry receiver 8 assigns a failure number, identifies the date, and registers the failure information including the field site ID and the registered failure content with the failure information DB 3 (step S85). When the failure content is transmitted in electronic data, the inquiry receiver 8 records the data with the failure information DB 3. When the failure content is provided in voice, the inquiry receiver 8 converts the voice into text data, and registers the data with the failure information DB 3.

FIG. 9A illustrates an example of failure information registered by the inquiry receiver 8 with the failure information DB 3. As illustrated in FIG. 9A, the inquiry receiver 8 registers the failure number at the entry of failure number, the date and time when the failure is reported at the entry of date and time, and identification information about the field site 101 at which the failure is reported at the entry of field site ID. The inquiry receiver 8 inputs information about a complaint from the manager 41 or the user 42 in text at the entry of the failure content. Other information is blank until being filled by the operator 43 after the failure analysis is performed and the measure is implemented.

Procedure of Failure Analysis and Measure Implementation

Figure 10:
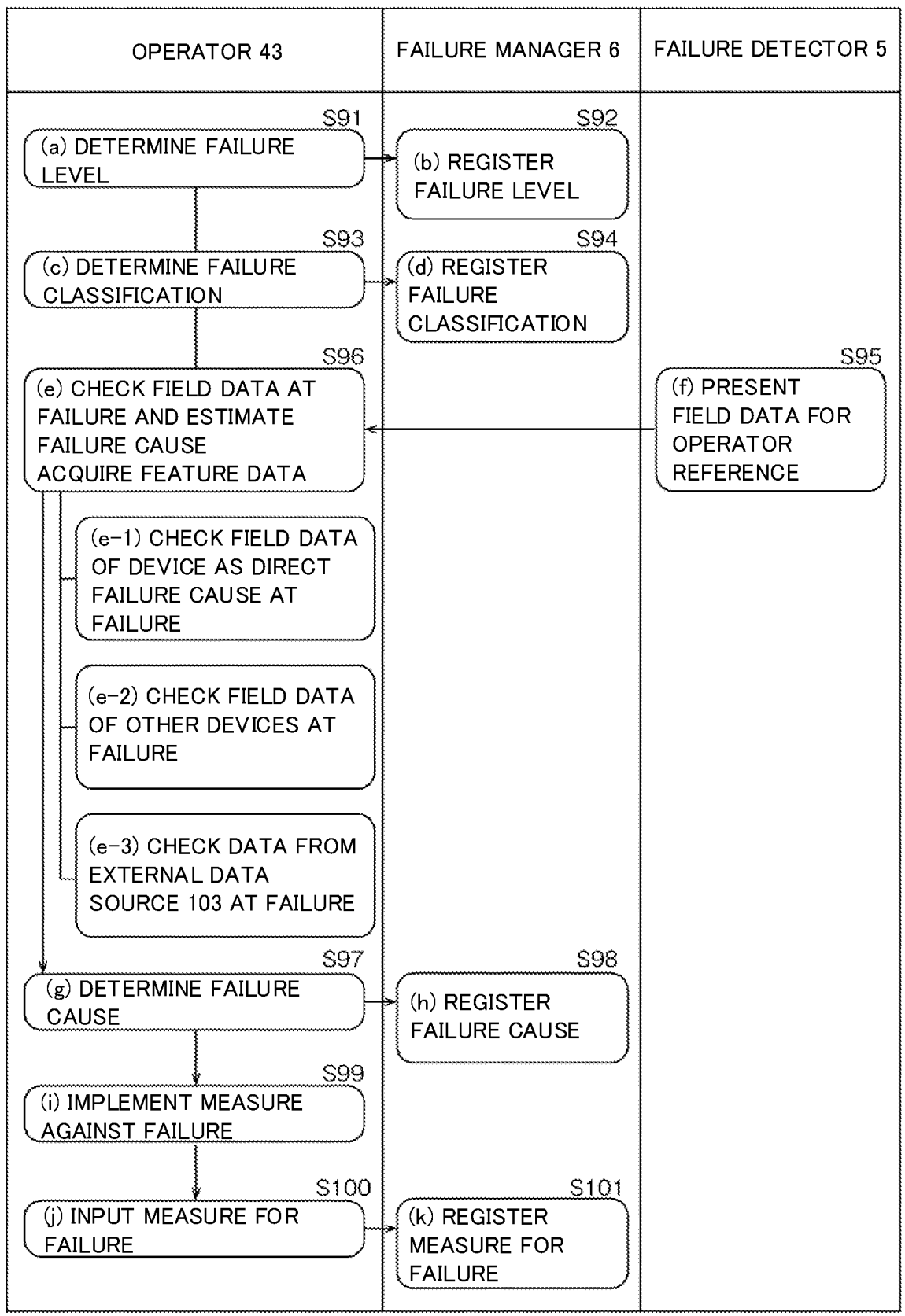
FIG. 10 is a diagram of an example procedure for analyzing and processing the reported failure.

The procedure of analyzing the reported service level failure and implementing a measure against the failure is described below with reference to FIG. 10.

The inquiry receiver 8 notifies the operator 43 that a failure is registered by, for example, displaying the failure on the display 4 together with a failure number.

(a) The operator 43 operates the failure manager 6 to access the failure information DB 3, checks the content of the notified failure, and determines the failure level (step S91).

(b) The operator 43 registers the determined failure level with the failure information DB 3 through the failure manager 6 as illustrated in the example of FIG. 9B (step S92).

(c) The operator 43 determines the failure classification for the reported failure (step S93).

(d) The operator 43 registers the failure classification with the failure information DB 3 through the failure manager 6 as illustrated in FIG. 9B (step S94).

(f) The failure detector 5 refers to the field data stored in the field data DB 2, and extracts the field data detected in the predetermined time slot with reference to when the failure or the inquiry occurs. The failure detector 5 performs the same operation for the external data. The time slot in which the field data is acquired may be adjustable with the operation performed by the operator 43. The failure detector 5 displays, on the display 4, the extracted field data and external data as the current field data illustrated in FIG. 13 to present the data to the operator 43 (step S95). The failure detector 5 acquires feature data of the extracted field data, associates the field data and the feature data with the failure information, and registers the data with the failure information DB 3.

(e) The operator 43 checks field data before a failure appearing on the display 4 occurs, and estimates the cause of the failure (step S96). This operation may typically include processes (e-1), (e-2), and (e-3) below.

(e-1) The operator 43 checks field data of the IoT device 9 that has directly caused a failure at the occurrence of the failure.

(e-2) The operator 43 checks field data of other IoT devices 9 at the occurrence of the failure.

(e-3) The operator 43 checks external data acquired from the external data source 103 at the occurrence of the failure.

With the operation performed by the operator 43, the display 4 displays the field data in a switching manner, or while arranging the field data pieces side by side, superimposing the field data pieces, or adjusting the time axis to allow comparison between the field data pieces.

(g) The operator 43 determines the failure cause for the reported failure (step S97).

(h) The operator 43 registers the failure cause determined for the registered failure through the failure manager 6 (step S98).

(i) The operator 43 implements a measure against the reported failure (step S99).

(j) The operator 43 registers the content of the measure implemented against the failure through the failure manager 6 (step S100).

(k) The failure manager 6 registers the content of the measure implemented against the registered failure (step S101).

As illustrated in FIG. 9B, information about the failure level, the failure classification, the failure cause, and the measure for the failure are additionally registered with the failure information DB 3 to complete failure information.

Procedure of Detecting Failure Symptom

The procedure of detecting a service level failure symptom using the failure symptom detector 1 is described with reference to FIG. 11.

This process is performed, for example, every time when new field data or external data is stored in the field data DB 2.

(a) The failure symptom detector 1 retrieves field data and external data when, for example, new field data or external data is stored in the field data DB 2 (step S111), but may retrieve the data at any timing. The failure symptom detector 1 calculates feature data of the retrieved field data and external data.

(b) The failure symptom detector 1 retrieves feature data of field data for a past failure from the failure information DB 3 (step S112).

(c) The failure symptom detector 1 determines, through similarity calculation, similarity between the newly acquired feature data and the feature data of the field data for the past failure read from the failure information DB 3. The failure symptom detector 1 specifies feature data with similarity higher than or equal to the reference. When the feature data pieces are specified more than intended, the failure symptom detector 1 extracts n pieces of feature data with similarity in the top n pieces (n is a natural number). The failure symptom detector 1 reads the field data, the external data, and the failure information associated with the extracted feature data, sorts the field data, the external data, and the failure information in order of similarity, and forms a list. The failure symptom detector 1 displays, on the display 4, as a notification to the operator 43, the formed list as a list of failures that are likely to occur (step S113).

The operator 43 can instruct sorting or classification of the failure information in the displayed list using the similarity, the failure level, the failure classification, or the failure cause as a key. In response to the instruction, the failure symptom detector 1 sorts or classifies the failure information and displays the failure information on the display 4. The operator 43 may selectively display, with the failure symptom detector 1, for example, field data, external data, and failure information about a specific failure alone.

Instead of using the similarity with the feature data at a past failure, for example, a failure symptom can be determined as below.

(c-1) The failure symptom detector 1 examines the field data newly registered with the field data DB 2 and determines whether the data has an abnormal change deviating from the reference range. Upon detecting an abnormal change, the failure symptom detector 1 determines the change as detection of a failure symptom.

(c-2) Relevant one or more pieces of field data are identified in the analysis of the cause of the failure. Subsequently, specificity is determined for the identified one or more pieces of field data. The identification information and the specificity of the identified one or more pieces of field data are registered with the failure information DB 3. When a new field data piece is provided from the field site 101, the specificity is determined from the field data piece. When the combination resembles a preregistered specificity combination, the failure symptom detector 1 indicates detection of a failure symptom.

(c-3) When analyzing the failure cause, the operator 43 registers conditions to be satisfied by the field data that occurs as a failure symptom. Examples of the conditions to be satisfied by the field data include (i) a combination of multiple numerical values of field data at the occurrence of a failure, and (ii) multiple numerical values of field data, changes of the values, or the order of the values at the occurrence of a failure symptom. Upon receiving a new piece of field data from the field site 101, the failure symptom detector 1 determines whether the received field data piece satisfies the set conditions and indicates a failure upon determining that the data piece satisfies the conditions.

(c-4) The failure symptom detector 1 includes a machine learning device such as a neural network. The machine learning device is trained using a combination of field data pieces at the occurrence of a failure and a combination of indicated failures as teachers. After the machine learning device is trained, when a new field data piece is provided from the field site 101, the failure symptom detector 1 receives the field data piece to determine whether the field data piece has a symptom. This method corresponds to an aspect of the method for determining similarity.

(d) The display 4 displays failure information extracted by the failure symptom detector 1 to present the failure symptom and accompanying information to the operator 43 (step S114). The accompanying information typically indicates field data when a failure symptom is detected, or information about a past similar failure. The details of display information is described later with reference to FIG. 13.

(e) The operator 43 checks the failure symptom and the accompanying information on the display 4 (step S115). The operator 43 refers to, for example, the failure cause and the measure for the failure included in the accompanying failure information to determine the measure to be implemented this time.

Procedure Proactively Performed Against Failure Symptom

An example procedure to be performed by the operator 43 against the service level failure symptom presented by the failure symptom detector 1 is described with reference to FIG. 12.

Figure 11:
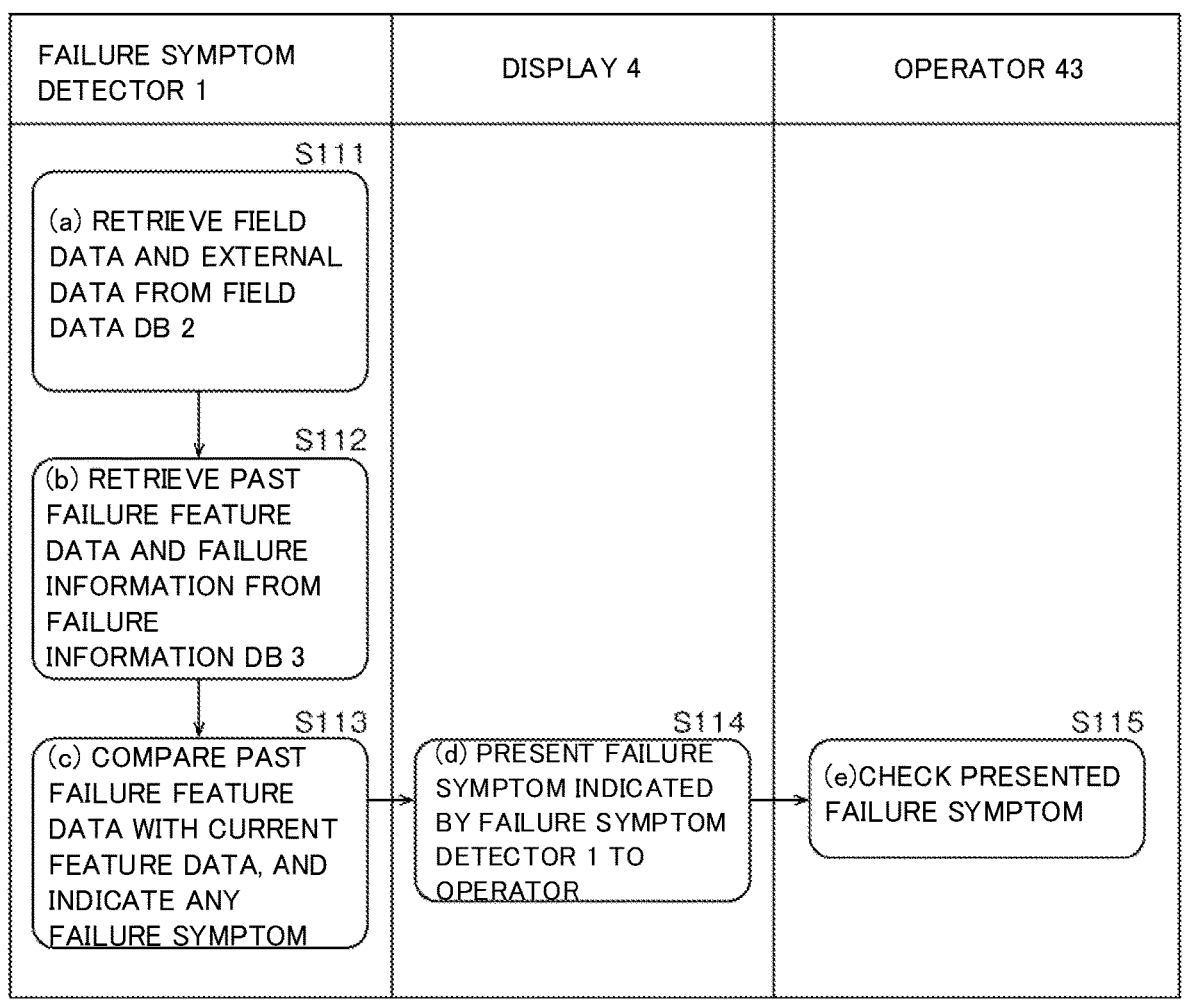
FIG. 11 is a diagram of an example procedure performed by a failure symptom detector to detect a failure symptom.
Figure 12:
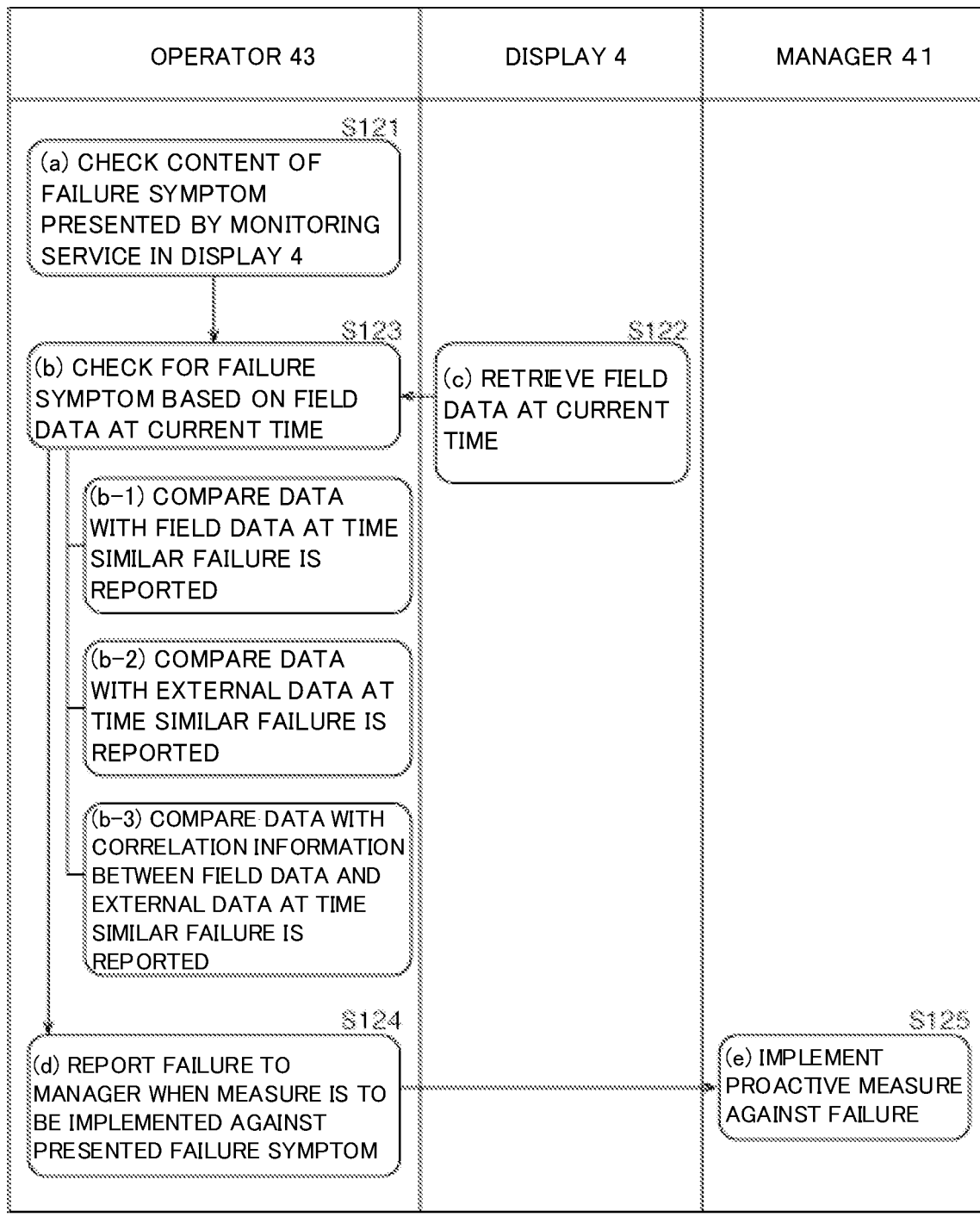
FIG. 12 is a diagram of an example procedure performed by a facility operator to implement a proactive measure against a failure symptom provided by the failure symptom detector.

For example, the procedure illustrated in FIG. 12 is performed after the failure symptom is displayed on the display 4 with a symptom presenting procedure illustrated in FIG. 11.

(a) First, the operator 43 checks the content of the failure symptom on the display 4 (step S121).

(c) Subsequently, the display 4 displays the field data and the external data at the current time to present the data to the operator 43 (step S122).

(b) The operator 43 checks, for example, the failure information, the field data, and the external data on the display 4, and determines whether any failure symptom actually occurs at the facility (step S123).

The operator 43 typically performs three comparisons (b-1), (b-2), and (b-3) below.

(b-1) The operator 43 compares the current field data with the field data at a time when a report of occurrence of a similar failure is made.

(b-2) The operator 43 compares the current external data with the external data at a time when a report of occurrence of a similar failure is made.

(b-3) The operator 43 compares correlation information between the current field data and the current external data with correlation information between the field data and the external data at a time when a report of occurrence of a similar failure is made.

(d) Through the above examination, upon determining that a measure is to be implemented against the presented failure symptom, the operator 43 reports, to the manager 41, a failure for which the symptom is detected and a proactive measure to be implemented against the failure based on the extracted failure information (step S124).

(e) The manager 41 implements the proactive measure against the failure based on the proactive measure for the failure reported by the operator 43 (step S125).

FIG. 13 illustrates an example screen configuration appearing on the display 4 in step S122 when the failure symptom detector 1 detects a service level failure symptom. As illustrated in FIG. 13, the display 4 displays time-series changes of numerical values indicating various field data pieces in a predetermined period before the current time and the specificity of the field data pieces, and time-series changes of numerical values indicating various field data pieces when a past failure symptom is detected or when a past similar failure occurs and the specificity of the field data pieces.

The displayed information is not limited to the time-series change of data, and includes changes of the positions of the IoT device 9 or the facility, and the floor on which the IoT device 9 is located.

The numerical values indicating specificity are values acquired through calculation using a combination of, for example, field data and external data. The numerical values indicating specificity may be calculated with any method. The examples of the calculation method include (a) to (d) below.

(a) Calculating the moving average of temporal changes of each field data piece at each time point.
(b) Expressing, for N types of field data, the moving average of each field data piece as a basis of an N-dimensional linear space.
(c) Learning to separate points in the space depending on the presence or absence of a failure using a support vector machine based on time information at the occurrence of a failure.
(d) Calculating, using the support vector machine, the probability of the presence or absence of a failure on the field data at the current time, and defining the probability as a numerical value indicating the specificity of the field data.

As described above, the system according to the present embodiment can automatically detect a service level failure symptom while keeping the IoT device 9 and the facility in operation. Thus, the system can appropriately adjust the situation to be comfortable.

Other Embodiments

The failure symptom detection system 100 according to the embodiment illustrated in FIG. 1 includes a single field site 101. Instead, the failure symptom detection system 100 may include multiple field sites 101, and a single center site 102 connected to these field sites 101 to communicate with the field sites 101.

The failure symptom detection system 100 according to the embodiment uses the changes of the field data and the external data as feature data, but may use other elements of data as feature data. For example, the failure symptom detection system 100 may directly use values of each data piece as feature data, or the integral of each data piece, or the correlation of data pieces as a feature.

When the field data includes m types of data and the external data includes L types of data, the feature data may be defined using a subset of all types of data instead of using all types of data, for example, any n types (m+L>n) of data alone may be used as feature data. In addition, different types of data may be differently weighted to be used as feature data.

In some embodiments, a combination of failure information and feature data of a failure that has occurred at one field site 101 may be used as failure symptom data at another field site 101. More specifically, data can be shared between multiple field sites 101. In this case, for example, a combination of failure information and feature data acquired at multiple field sites 101 is registered with the failure information DB 3 for common use. When, for example, the same or similar feature data to the feature data of a failure that has occurred at a first field site 101a is acquired from field data from a second field site 101b, the failure symptom detection system 100 may provide a notification of an increased likelihood of a similar failure at the second field site 101b.

In the above embodiment, the field site 101 transmits field data once a day to the center site 102, but may transmit field data with any frequency. For example, the field site 101 may transmit field data in real time to the center site 102. In this case, for example, the failure symptom detector 1 can provide a notification of information relating to one or more failures that are more likely to occur in real time by constantly, regularly, or cyclically monitoring the current field data. In this case as well, the failure symptom detector 1 may provide, in multiple times, a notification of multiple failures that are more likely to occur in the descending or ascending order of likelihood based on the similarity determined through similarity calculation.

When displaying failures that are likely to occur in a list form on the display 4, the failure symptom detector 1 may sort or classify the items by the failure level, the failure classification, or the failure cause using data included in the failure information as a key.

In the above embodiment, external data from the external data source 103 is used as an example, but the external data source may be unused.

In the above example, the failure symptom detector 1 detects a failure symptom based on the similarity of feature data, but may detect a failure symptom differently. For example, in addition to or instead of the function of detecting a symptom based on the similarity, the failure symptom detector 1 may have another symptom detection function.

For example, the failure symptom detector 1 may determine whether the feature amount such as a value of one or more predetermined field data pieces, a change value, or a correlation is within or outside a reference range, and provide a notification of detection of a failure symptom when the feature amount is outside the reference range. For example, associating the reference range with the failure information in advance allows reference to a past measure.

Upon receiving new field data pieces from the field site 101, the failure detector 5 may determine specificity for each field data piece, and may provide a notification of detection of a failure symptom when the combination is similar to a combination of preregistered specificity. In this case, during the analysis of the cause of the failure, (i) relevant one or more pieces of field data may be identified, (ii) specificity of the identified one or more pieces of field data may be determined, and (iii) the identification information and the specificity of the identified one or more pieces of field data may be registered with the failure information DB 3.

The failure symptom detector 1 may determine whether the provided field data satisfies the set condition and may indicate detection of a failure symptom upon determining that the provided field data satisfies or fails to satisfy the set condition. In this case, the operator 43 registers a condition to be satisfied by the field data that occurs as a failure symptom in the analysis of the failure cause. The condition to be satisfied by the field data is, for example, (i) a combination of multiple numerical values of field data at the occurrence of a failure, or (ii) multiple numerical values of field data at the occurrence of a failure symptom, or the change of the values and the order of the values.

As described above, the failure symptom detector 1 may be a machine learning device such as a neural network. In this case, the machine learning device is trained with a combination of field data pieces at the occurrence of a failure and a combination of indicated failures as teachers. After the machine learning device is trained, the field site 101 provides a new field data piece to the failure symptom detector 1 to cause the failure symptom detector 1 to determine the presence or absence of a symptom. This method corresponds to an aspect of a method for determining similarity.

In the example described above, a failure that is highly likely to occur, or a failure symptom, is automatically detected. The system according to the present disclosure is not limited to this example, and may simply store, adjust, and provide data referred to by the operator 43 that detects a symptom.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

As described above in detail, a failure symptom detection system according to an aspect of the present disclosure can automatically and immediately detect a failure symptom and appropriately adjust the situation to a comfortable state when a user reports a service level failure of producing a discomfort feeling at a facility, for example, when a user reports a failure such as an excessively hot and humid spot while keeping the IoT device and the facility in operation.

REFERENCE SIGNS LIST

1 Failure symptom detector
2 Field data DB
3 Failure information DB
4 Display
5 Failure detector
6 Failure manager
7 Data collector
8 Inquiry receiver
9 IoT device
9a Illuminator
10 Monitor
10a Field network communication function
10b Internet communication function
30, 32 Communication network
33 Device gateway
34 Application gateway
37, 38 Communication terminal
41 Manager
42 User
43 Operator
51 Processor
52 Memory
53 Display
54 Input device
55 Communicator
56 Auxiliary memory
100 Failure symptom detection system
101 Field site
102 Center site
103 External data source

The invention claimed is:

1. A failure symptom detection system for detecting a symptom of a failure in a service level indicating satisfaction of a user at a field site including a facility including a plurality of Internet of things devices, the failure symptom detection system comprising:
   a first storage to collect and store field data of each of the plurality of Internet of things devices;
   feature extracting circuitry to acquire feature data of the field data based on a report on a failure in the service level felt by a user of the facility;
   a second storage to accumulate failure information associating the feature data of the field data at an occurrence of the failure with content of the failure in the service level felt by the user; and
   failure symptom detecting circuitry to monitor the field data stored in the first storage, and produce, upon detecting feature data matching the feature data accumulated in the second storage, output indicating detection of a symptom of the failure in the service level associated with the feature data.

2. The failure symptom detection system according to claim 1, wherein the first storage, the feature extracting circuitry, the second storage, and the failure symptom detecting circuitry are included in a center site that is located separately from the field site and is to connect to the field site through a network.

3. The failure symptom detection system according to claim 2, wherein the center site includes data collecting circuitry, and the data collecting circuitry collects field data from a plurality of field sites, and collects external data from an external data source.

4. The failure symptom detection system according to claim 1, further comprising:
   failure managing circuitry to append, to content of the report on the failure from the user, failure information including at least one of a failure level, failure classification, or a failure cause, and register in the second storage the content of the report on the failure with the failure information appended thereto.

5. The failure symptom detection system according to claim 1, wherein the failure symptom detecting circuitry monitors the field data stored in the first storage, and produces output indicating detection of a symptom of the failure upon detecting a change exceeding a reference.

6. The failure symptom detection system according to claim 1, wherein the failure symptom detecting circuitry applies content of a failure reported at a field site and feature data of field data detected in a time slot in which the failure is reported to another field site, and determines whether similar feature data is acquirable from field data of the another field site to check for a symptom of the failure.

7. The failure symptom detection system according to claim 1, wherein the failure symptom detecting circuitry determines similarity between feature data of field data when the report is made and feature data of current field data, and provides, in real time, a notification of a failure with increased likelihood of occurrence based on the similarity.

8. The failure symptom detection system according to claim 1, wherein the failure symptom detecting circuitry determines similarity between feature data of field data when the report is made and feature data of current field data, makes a list by listing failures with increased likelihood of occurrence in order of the likelihood of occurrence based on the similarity, and provides a notification of the failures with the increased likelihood of occurrence using the list.

9. The failure symptom detection system according to claim 8, wherein the failure symptom detecting circuitry lists the failures with the increased likelihood of occurrence through sorting or classifying the failures or items to be listed by a preregistered failure level, preregistered failure classification, or a preregistered failure cause.

10. The failure symptom detection system according to claim 1, wherein the feature extracting circuitry acquires the feature data of the field data by identifying, from the field data stored in the first storage, based on the report on the failure in the service level felt by the user of the facility, field data at the occurrence of the failure in the service level, identifying a change of the field data at the occurrence of the failure in the service level as a feature, and extracting feature data representing the feature.

11. The failure symptom detection system according to claim 10, wherein the feature of the field data is a change pattern in the field data on a time or in a space.

12. The failure symptom detection system according to claim 1, wherein each of the plurality of Internet of things devices converts a voice of the user collected from a microphone into text to generate the field data.

13. A failure symptom detection method for detecting a symptom of a failure in a service level indicating satisfaction of a user at a field site including a facility including a plurality of Internet of things devices, the failure symptom detection method comprising:
  collecting and storing field data from each of the plurality of Internet of things devices;
  acquiring feature data of the field data based on a report on a failure in the service level felt by a user of the facility;
  accumulating failure information associating the feature data of the field data at an occurrence of the failure with content of the failure in the service level felt by the user; and
  monitoring the stored field data and producing, upon detecting feature data matching the accumulated feature data, output indicating detection of a symptom of the failure in the service level associated with the feature data.

14. A non-transitory computer-readable recording medium storing a program for causing a computer, for detecting a symptom of a failure in a service level indicating satisfaction of a user at a field site including a facility including a plurality of Internet of things devices, to perform operations comprising:
  collecting and storing field data from each of the plurality of Internet of things devices;
  acquiring feature data of the field data based on a report on a failure in the service level felt by a user of the facility;
  accumulating failure information associating the feature data of the field data at an occurrence of the failure with content of the failure in the service level felt by the user; and
  monitoring the stored field data and producing, upon detecting feature data matching the accumulated feature data, output indicating detection of a symptom of the failure in the service level associated with the feature data.

* * * * *